United States Patent
Yamamoto et al.

(10) Patent No.: US 8,247,485 B2
(45) Date of Patent: Aug. 21, 2012

(54) FIBROUS BASIC MAGNESIUM SULFATE-CONTAINING PELLETS AND PRODUCTION OF MOLDED PROPYLENE POLYMER PRODUCTS

(75) Inventors: Shinichi Yamamoto, Ube (JP); Takashi Kishimoto, Ube (JP)

(73) Assignee: UBE Material Industries, Ltd, Yamaguchi (JP)

( * ) Notice: Subject to any disclaimer, the term of this patent is extended or adjusted under 35 U.S.C. 154(b) by 0 days.

(21) Appl. No.: 13/014,073

(22) Filed: Jan. 26, 2011

(65) Prior Publication Data

US 2012/0029123 A1 Feb. 2, 2012

(30) Foreign Application Priority Data

Jan. 27, 2010 (JP) .................................. 2010-015540

(51) Int. Cl.
*C08K 3/30* (2006.01)
(52) U.S. Cl. ........................................................ 524/423
(58) Field of Classification Search ................. 523/351; 524/423
See application file for complete search history.

(56) References Cited

U.S. PATENT DOCUMENTS
2011/0077336 A1 * 3/2011 Takeuchi et al. .............. 524/315

FOREIGN PATENT DOCUMENTS
JP 08-134321 5/1996
* cited by examiner

*Primary Examiner* — Peter Szekely
(74) *Attorney, Agent, or Firm* — Nixon Peabody, LLP; Jeffrey L. Costellia

(57) ABSTRACT

Fibrous basic magnesium sulfate-containing pellets comprising an olefin polymer and fibrous basic magnesium sulfate in a weight ratio of 80:20 to 20:80 and further comprising a nucleating agent in an amount of 0.3 to 8 weight parts based on 100 weight parts of the olefin polymer and in an amount of 0.2 to 4 weight parts based on 100 weight parts of the fibrous basic magnesium sulfate are favorably employable for producing molded fibrous basic magnesium sulfate-containing propylene polymer products which show high flexural modulus, high flexural strength and high yield strength in tension as well as excellent thermal stability.

7 Claims, No Drawings

FIBROUS BASIC MAGNESIUM SULFATE-CONTAINING PELLETS AND PRODUCTION OF MOLDED PROPYLENE POLYMER PRODUCTS

FIELD OF THE INVENTION

The present invention relates to fibrous basic magnesium-containing pellets. The invention further relates to a process for producing molded propylene products using the fibrous basic magnesium sulfate-containing pellets.

BACKGROUND OF THE INVENTION

Propylene polymers are thermoplastic and hence can be melted by heating and molded to give articles having various shapes. Therefore, the propylene polymers are widely employed for producing outer housings of household electric appliances such as refrigerators and washing machines and various molded products such as trays, shelf plates, wrapping films. It is known that the propylene polymers are mixed with additives such as inorganic fillers, nucleating agents and elastomers so as to improve rigidity and impact strength of the molded products. As the inorganic fillers, there are known fibrous inorganic fillers such as fibrous basic magnesium sulfate and non-fibrous fillers such as talc. Basic magnesium sulfate has the chemical formula of $MgSO_4 \cdot 5Mg(OH)_2 \cdot 3H_2O$.

JP 8-134321A describes a molded propylene polymer product comprising crystalline propylene polymer, specific elastomer, talc, fibrous basic magnesium sulfate (fibrous magnesium oxysulfate) and a nucleating agent. This publication teaches that a molded product comprising crystalline propylene polymer, elastomer, talc, fibrous basic magnesium sulfate and a nucleating agent (Example 2) shows higher modulus in flexure than a molded product comprising crystalline propylene polymer, elastomer, talc and fibrous basic magnesium sulfate (Comparison Example 3), which in turn shows higher modulus in flexure than a molded product comprising crystalline propylene polymer, elastomer and talc (Comparison Example 2). This publication further describes that the propylene polymer products can be produced by injection molding performed after dry-blending of the components or after melt-kneading of the components.

As is taught in JP 8-134321A, a molded product comprising propylene polymer, fibrous basic magnesium sulfate and a nucleating agent shows a higher modulus in flexure than a molded propylene polymer product comprising no additives. In certain uses of molded propylene polymer products, however, it is required to increase the modulus in flexure of these products. Otherwise, in certain uses of molded propylene polymer products, it is required for the molded propylene polymer products to have high physical properties other than the modulus in flexure. For instance, the molded propylene polymer products employed as the outer housings of household electric appliances, trays or shelf plates should have high flexural strength and high resistance to deformation under heating. As for wrapping sheets, it is required that the wrapping sheets show high tensile yield strength so that the thin wrapping sheet shows high resistance to deformation under high tensile conditions.

SUMMARY OF THE INVENTION

Accordingly, it is an object of the invention to provide a process for producing molded propylene polymer product showing high modulus in flexure, high flexural strength and high tensile yield strength and further showing high thermal stability.

The present inventors have found that molded propylene polymer products produced by mixing pellets (master batch pellets) comprising an olefin polymer, fibrous basic magnesium sulfate in a high concentration, a nucleating agent for propylene polymers with matrix propylene polymer, melt-kneading the mixture and molding the melt-kneaded mixture shows higher modulus in flexure, higher flexural strength, higher tensile yield strength and higher thermal stability than molded propylene polymer products produced by known process comprising mixing an olefin polymer, fibrous basic magnesium sulfate, the nucleating agent and propylene polymer all together, melt-kneading the mixture and molding the melt-kneaded mixture.

It has been not well known the reason why the use of the master batch pellets comprising olefin polymer, fibrous basic magnesium sulfate filler and the nucleating agent is effective to produce a molded propylene polymer product showing improvements in physical properties such as modulus in flexure and flexural strength. However, the inventors assume the following mechanisms.

The fibrous basic magnesium sulfate has hydroxyl groups and hence shows high affinity to the nucleating agent. Therefore, most of the nucleating agent in the pellets take positions on or in the vicinity of the surfaces of the fibrous basic magnesium sulfate fillers. In the steps of mixing and melt-kneading the pellets with matrix propylene polymer, the nucleating agents diffuse in the melt-kneaded product, keeping their positions on or in the vicinity of the fibrous basic magnesium sulfate fillers. In the step of melt-kneading, the matrix propylene polymer crystallizes starting from the position of the nucleating agent present on or in the vicinity of the fibrous basic magnesium sulfate filler. Therefore, the crystalline propylene polymer grows mainly in the vicinity of the fibrous basic magnesium sulfate fillers, so that the molded propylene polymer product shows improved physical properties.

Accordingly, there are provided by the present invention fibrous basic magnesium sulfate-containing pellets comprising an olefin polymer and fibrous basic magnesium sulfate in a weight ratio of 80:20 to 20:80 and further comprising a nucleating agent for propylene polymers in an amount of 0.3 to 8 weight parts based on 100 weight parts of the olefin polymer and in an amount of 0.2 to 4 weight parts based on 100 weight parts of the fibrous basic magnesium sulfate.

Preferred fibrous basic magnesium sulfate-containing pellets provided by the invention are described below:

(1) The pellets which contains an aliphatic mono carboxylic acid or a metal salt thereof in an amount of 0.1 to 10 weight parts based on 100 weight parts of the fibrous basic magnesium sulfate.

(2) The olefin polymer is a polymer selected from the group consisting of polypropylene, polyethylene and an ethylene-propylene copolymer.

(3) The fibrous basic magnesium sulfate has a mean thickness in the range of 0.1 to 1.0 μm and a mean aspect ratio in the range of 5 to 50.

(4) The nucleating agent is a compound selected from the group consisting of an aromatic phosphate, an aromatic carboxylic acid, an aliphatic dicarboxylic acid, rosin acid and their salts.

(5) The nucleating agent is a compound selected from the group consisting of 2,2'-methylene bis(4,6-di-tert-butylphenyl)phosphate, benzoic acid, phthalic acid, hexahydrophthalic acid and their metal salts.

There is further provided by the invention a process for producing a molded propylene polymer product, which comprises the steps of:

blending 100 weight parts of the pellets of the invention with 100 to 1,000 weight parts of propylene polymer to give a blended product;

kneading the blended product under molten conditions to give a kneaded product; and molding the kneaded product.

EFFECTS OF THE INVENTION

The molded propylene polymer products produced by the process of the invention utilizing the pellets (i.e., master batch pellets) shows improved physical properties such as prominently improved modulus in flexure, improved flexural strength, improved tensile yield strength and improved thermal stability. Therefore, the molded propylene polymer products produced by the process of the invention utilizing the master batch pellets are favorably employable for a variety of molded products such as outer housing material of household electric appliances, trays, shelf plates and wrapping material.

EMBODIMENTS OF THE INVENTION

The fibrous basic magnesium sulfate-containing pellets (master batch pellets) according to the invention comprises an olefin polymer, fibrous basic magnesium sulfate, and a nucleating agent for propylene polymers. The pellets comprises the olefin polymer and fibrous basic magnesium sulfate in a weight ratio of 80:20 to 20:80, preferably 50:50 to 20:80, more preferably 40:60 to 20:80. The nucleating agent for propylene polymers is contained in the pellets in an amount of 0.3 to 8 weight parts based on 100 weight parts of the olefin polymer and in an amount of 0.2 to 4 weight parts based on 100 weight parts of the fibrous basic magnesium sulfate.

The olefin polymer preferably shows a melt flow rate (MFR, determined according to ASTM D1238, at 230° C. and under 2.16 kg load) in the range of 3 to 300 g/10 min. The olefin polymer can be ethylene polymer (polyethylene), propylene polymer (polypropylene), or ethylene-propylene copolymer. The polypropylene can be crystalline propylene homopolymer or crystalline propylene copolymer containing units derived from other monomers. Thus, the polyethylene and polypropylene may contain a small amount of units derived from other monomers. The olefin polymer can comprise two or more different olefin polymers.

The fibrous basic magnesium sulfate (namely, fibrous basic magnesium sulfate filler) preferably comprises fibrous particles having a mean thickness in the range of 0.1 to 1.0 μm and a mean aspect ratio (mean length/mean thickness) of 5 or more, particularly in the range of 5 to 50. The mean length and mean thickness of the fibrous basic magnesium sulfate can be determined from enlarged SEM (Scanning Electron Microscope) image. The fibrous basic magnesium sulfate can be in the form of aggregated or combined, particles.

The nucleating agents for propylene polymers are publicly known. In the pellets and process of the invention, an optionally selected known nucleating agent can be employed. It is preferred, however, that the nucleating agent is an aromatic phosphate, an aromatic carboxylic acid, an aliphatic dicarboxylic acid, rosin acid, or one of their salts. The nucleating agent can be used alone or in combination.

The aromatic phosphate can be bis(4-tert-butylphenyl) phosphate, 2,2'-methylene bis(4,6-di-tert-butylphenyl) phosphate and 2,2'-ethylidene bis(4,6-di-tert-butylphenyl) phosphate. Examples of the salts of the aromatic phosphates can be salts of lithium sodium, potassium and magnesium.

The aromatic carboxylic acid can be benzoic acid, phthalic acid or hexahydrophthalic acid. Examples of the salts of the aromatic carboxylic acids can be metal salts of lithium, sodium, potassium or magnesium.

The aliphatic dicarboxylic acid can be a alicyclic hydrocarbyl compound having carboxyl group(s). The alicyclic hydrocarbyl compound preferably has 3 to 8 carbon atoms. The alicyclic hydrocarbyl compound can comprises two or more rings and preferably is a saturated alicyclic hydrocarbyl compound.

Examples of the metal salts of the aliphatic dicarboxylic acids include salts of lithium, sodium, magnesium, calcium, strontium, zinc, and aluminum. Preferred salts of aliphatic dicarboxylic acids can be represented by the below-illustrated formulas (I) and (II).

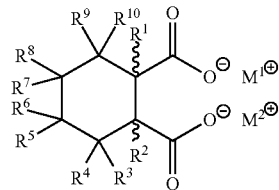

In the formula (I), each of $M^1$ and $M^2$ independently represents lithium, sodium, magnesium, calcium, strontium, zinc or basic aluminum, and each of $R^1$, $R^2$, $R^3$, $R^4$, $R^5$, $R^6$, $R^7$, $R^8$, $R^9$ and $R^{10}$ independently represents a hydrogen atom or an alkyl group having 1 to 9 carbon atoms. Any adjoining groups of $R^3$, $R^4$, $R^5$, $R^6$, $R^7$, $R^8$, $R^9$ and $R^{10}$ can be combined to form a ring.

Formula (II)

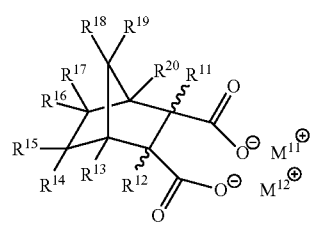

In the formula (II), each of $M^{11}$ and $M^{12}$ independently represents lithium, sodium, magnesium, calcium, strontium, zinc or basic aluminum, and each of $R^{11}$, $R^{12}$, $R^{13}$, $R^{14}$, $R^{15}$, $R^{16}$, $R^{17}$, $R^{18}$, $R^{19}$ and $R^{20}$ independently represents a hydrogen atom or an alkyl group having 1 to 9 carbon atoms. Any adjoining groups of $R^{13}$, $R^{14}$, $R^{15}$, $R^{16}$, $R^{17}$, $R^{18}$, $R^{19}$ and $R^{20}$ can be combined to form a ring.

The metal, salt of the aliphatic dicarboxylic acid represented by the formula (I) can be a metal salt of a cyclohexane-1,2-dicarboxylic acid, specifically, calcium cyclohexane-1,2-dicarboxylate. The metal salt of the aliphatic dicarboxylic acid represented by the formula (II) can be a metal salt of a bicyclo[2.2.1]heptane-2,3-dicarboxylic acid, specifically, sodium bicyclo[2.2.1]-heptane-2,3-dicarboxylate. These aliphatic dicarboxylic acid metal salts are described in U.S. 2007/0080485A.

Examples of rosin acids include dehydroabietic acid, dihydroabietic acid, dihydropimaric acid, and their derivatives. Examples of metal salts of rosin acids include salts of lithium, sodium, beryllium, potassium, magnesium, zinc, or aluminum. The rosin acids and metal acids thereof are described in JP 9-157437A.

As the nucleating agents, aromatic phosphoric acid esters and aromatic carboxylic acids are preferred. Most preferred nucleating agents are 2,2'-methylene-bis(4,6-di-tert-butylphenyl)phosphoric acid, benzoic acid, phthalic acid, hexahydrophthalic acid, and their metal salt.

The fibrous basic magnesium sulfate-containing pellets of the invention preferably contains an aliphatic monocarboxylic acid or its metal salt. The aliphatic monocarboxylic acid can be saturated or unsaturated and preferably contains 12 to 22 carbon atoms. The saturated aliphatic monocarboxylic acid can be lauric acid, tridecylic acid, myristic acid, pentadecylic acid, palmitic acid, margaric acid, stearic acid, nonadecylic acid, arachidic acid, or behenic acid. The unsaturated aliphatic monocarboxylic acid can be myristoleic acid, palmitoleic acid, oleic acid, elaidic acid, vaccenic acid, gadoleic acid, or erucic acid.

The metal salt of the aliphatic monocarboxylic acid preferably is a salt of magnesium, calcium, lithium or zinc. Most preferred is the magnesium salt.

The aliphatic monocarboxylic acid or its metal salt is preferably contained in the pellets in an amount of 0.1 to 10 weight parts, specifically 0.5 to 5.0 weight parts, based on 100 weight parts of the fibrous basic magnesium sulfate.

The fibrous basic magnesium sulfate-containing pellets preferably is in the form of cylinder and preferably has a diameter in the range of 1 to 5 mm and a length in the range of 1 to 5 mm. It is preferred that the weight of 50 pellets is in the range of 0.5 to 5.0 g.

The fibrous basic magnesium sulfate-containing pellets can be produced by dry-blending the above-mentioned components, melt-kneading the resulting mixture, and molding the kneaded product in the form of pellets.

The fibrous basic magnesium sulfate-containing pellets can be favorably employed for producing molded articles comprising propylene resin composition.

In the production of the molded articles comprising propylene resin composition, the fibrous basic magnesium sulfate-containing pellets and propylene polymer are mixed, melt-kneaded, and molded.

In the production of the molded articles, the propylene polymer is preferably employed in an amount of 100 to 1,000 weight parts based on 100 weight parts of the fibrous basic magnesium sulfate-containing pellets.

The propylene polymer preferably shows a melt flow rate (MFR, determined according to ASTM D1238, at 230° C. and under 2.16 kg load) in the range of 3 to 300 g/10 min. The propylene polymer can take any forms such as powder, flakes and pellets.

In the step of mixing the fibrous basic magnesium sulfate-containing pellets and propylene polymer, additives for the production of polypropylene articles can be incorporated. Examples of the additives include inorganic fillers such as talc and calcium carbonate, antioxidants, UV absorbing agents, pigments, antistatic agent, anti-corrosive agents, flame retardants, lubricants, neutralizing agents, foaming agents, plasticizers, anti-foaming agents, and cross-linking agents.

The molding can be performed by injection molding, extrusion molding, calender molding, blow molding, foaming molding, or centrifugal molding.

The fibrous basic magnesium sulfate is preferably incorporated into the molded propylene polymer composition in an amount of 2 to 15 weight %. The nucleating agent is preferably incorporated into the molded propylene polymer composition in an amount of 0.004 to 0.6 weight %.

The present invention is further described by the following non-limiting examples.

EXAMPLES 1 To 4

(1) Production of Fibrous Basic Magnesium Sulfate-Containing Pellets

Propylene polymer [MFR 49.4 g/10 min., at 230° C. and 2.16 kg), fibrous basic magnesium sulfate (mean length: 15 µm, mean thickness: 0.5 µm), sodium 2,2'-methylene-bis(4,6-di-tert-butylphenyl)phosphate and magnesium stearate were dry-blended in a tumbler in the relative weight amounts set forth in Table 1. The resulting mixture was placed in a twin screw extruder heated to 200° C. and extruded to give a polymer composition strand having a diameter of 3 mm. The strand was cut to give pellets containing fibrous basic magnesium sulfate.

TABLE 1

| | PP | Filler | Nucleating agent | Mg stearate |
|---|---|---|---|---|
| Example 1 | 30.0 | 70.0 | 0.7 | 1.47 |
| Example 2 | 40.0 | 60.0 | 0.6 | 1.26 |
| Example 3 | 50.0 | 50.0 | 0.5 | 1.05 |
| Example 4 | 70.0 | 30.0 | 0.3 | 0.63 |

Remarks:
PP: Propylene polymer
Filler: fibrous basic magnesium sulfate
Nucleating agent: sodium 2,2'-methylene-bis(4,6-di-tert-butylphenyl)phosphate
Mg stearate: magnesium stearate (2) Production of Molded Propylene Resin Composition Product The fibrous basic magnesium sulfate-containing pellets produced in (1) above and propylene polymer [MFR 49.4 g/10 min., at 230° C. and 2.16 kg) were mixed in the relative weight amounts set forth in Table 2, and subsequently injection-molded at 200° C. to produce test pieces. The test piece comprised the components in the relative weight amounts set forth below:

propylene polymer: 90, fibrous basic magnesium sulfate: 10, sodium 2,2'-methylene-bis(4,6-di-tert-butylphenyl)phosphate: 0.1, magnesium stearate: 0.21

TABLE 2

| | Fibrous basic magnesium sulfate-containing pellets | Propylene polymer |
|---|---|---|
| Example 1 | 102.17 | 600 |
| Example 2 | 101.86 | 500 |
| Example 3 | 101.55 | 400 |
| Example 4 | 100.93 | 200 |

(3) Evaluations

The test pieces produced in (2), were subjected to measurements of modulus in flexure, flexural strength, yield strength in tension, and thermal stability. Results of the measurements are set forth in Table 3.

Modulus in flexure: determined by the method defined in ASTM D790

Flexural strength: determined by the method defined in ASTM D790

Yield strength in tension: determined by the method defined in ASTM D638. In the measurement, the test piece was formed to correspond to the test piece according to ASTM Type 1.

Thermal stability (temperature at which the test piece shows its thermal deformation); determined by the method defined in ASTM D648.

COMPARISON EXAMPLE 1

Propylene polymer [MFR 49.4 g/10 min., at 230° C. and 2.16 kg), fibrous basic magnesium sulfate (mean length: 15 μm, mean thickness: 0.5 μm), sodium 2,2'-methylene-bis(4,6-di-tert-butylphenyl)phosphate and magnesium stearate were dry-blended in a tumbler in the relative weight amounts of 90:10:0.1:0.21. The blended mixture was subsequently injection-molded at 200° C. to produce test pieces.

The test pieces were subjected to measurements of modulus in flexure, flexural strength, yield strength in tension, and thermal stability. Results of the measurements are set forth in Table 3.

TABLE 3

|  | Modulus in flexure (MPa) | Flexural strength (MPa) | Yield strength (MPa) | Thermal stability (° C.) |
| --- | --- | --- | --- | --- |
| Example 1 | 3653 | 50.3 | 27.8 | 133.6 |
| Example 2 | 3655 | 50.0 | 28.0 | 133.7 |
| Example 3 | 3617 | 50.4 | 27.8 | 133.8 |
| Example 4 | 3615 | 50.6 | 27.8 | 133.8 |
| Com. Ex. 1 | 3178 | 49.6 | 27.3 | 131.2 |

As is seen from the results set forth in Table 3, the molded propylene polymer composition products of Examples 1-4 which were produced using the pellets containing fibrous basic magnesium sulfate and sodium 2,2'-methylene-bis(4,6-di-tert-butylphenyl)phosphate show prominently high modulus in flexure as well as improved flexural strength, yield strength in tension and thermal stability, as compared with the molded propylene polymer composition product of Comparison Example 1 which was produced by way of pelletization of the fibrous basic magnesium sulfate and sodium 2,2'-methylene-bis(4,6-di-tert-butylphenyl)phosphate.

EXAMPLE 5

The procedures of Example 1 were repeated except that fibrous basic magnesium-containing pellets were produced in the step (1) by varying the weight ratio of the propylene polymer, fibrous basic magnesium sulfate, sodium 2,2'-methylene-bis(4,6-di-tert-butylphenyl)phosphate and magnesium stearate to 30.0:70.0:2.1:1.47 and that the weight ratio of the fibrous basic magnesium sulfate-containing pellets and propylene polymer was varied in the step (2) to 103.57:600, to produce test pieces.

The test pieces had the following physical properties:
modulus in flexure: 3,839 MPa
flexural strength: 49.6 MPa
yield strength in tension: 27.5 MPa
thermal stability: 134.8° C. (deforming temperature)

EXAMPLE 6

The procedures of Example 1 were repeated except that sodium 2,2'-methylene-bis(4,6-di-tert-butylphenyl)-phosphate was replaced with 2,2'-methylene-bis(4,6-di-tert-butylphenyl)phosphoric acid, and that fibrous basic magnesium-containing pellets were produced in the step (1) using the propylene polymer, fibrous basic magnesium sulfate, 2,2'-methylene-bis(4,6-di-tert-butylphenyl)phosphoric acid and magnesium stearate in the weight ratio of 30.0:70.0:0.7:1.47, to produce test pieces.

The test pieces had the following physical properties;
modulus in flexure: 3,519 MPa
flexural strength: 49.3 MPa
yield strength in tension: 27.7 MPa
thermal stability: 132.9° C. (deforming temperature)

EXAMPLE 7

The procedures of Example 1 were repeated except that sodium 2,2'-methylene-bis(4,6-di-tert-butylphenyl)-phosphate was replaced with hexahydrophthalic acid, and that fibrous basic magnesium-containing pellets were produced in the step (1) using the propylene polymer, fibrous basic magnesium sulfate, hexahydrophthalic acid and magnesium stearate in the weight ratio of 30.0:70.0:0.7:1.47, to produce test pieces.

The test pieces had the following physical properties:
modulus in flexure: 3,435 MPa
flexural strength: 49.1 MPa
yield strength in tension: 27.8 MPa
thermal stability: 131.4° C. (deforming temperature)

What is claimed is:

1. Fibrous basic magnesium sulfate-containing pellets comprising an olefin polymer and fibrous basic magnesium sulfate in a weight ratio of 80:20 to 20:80 and further comprising a nucleating agent for propylene polymers in an amount of 0.3 to 8 weight parts based on 100 weight parts of the olefin polymer and in an amount of 0.2 to 4 weight parts based on 100 weight parts of the fibrous basic magnesium sulfate.

2. The pellets of claim 1, which contain an aliphatic monocarboxylic acid or a metal salt thereof in an amount of 0.1 to 10 weight parts based on 100 weight parts of the fibrous basic magnesium sulfate.

3. The pellets of claim 1, wherein the olefin polymer is a polymer selected from the group consisting of polypropylene, polyethylene and an ethylene-propylene copolymer.

4. The pellets of claim 1, wherein the fibrous basic magnesium sulfate has a mean thickness in the range of 0.1 to 1.0 μm and a mean aspect ratio in the range of 5 to 50.

5. The pellets of claim 1, wherein the nucleating agent is a compound selected from the group consisting of an aromatic phosphate, an aromatic carboxylic acid, an aliphatic dicarboxylic acid, rosin acid and their salts.

6. The pellets of claim 1, wherein the nucleating agent is a compound selected from the group consisting of 2,2'-methylene bis(4,6-di-tert-butylphenyl)phosphate, benzoic acid, phthalic acid, hexahydrophthalic acid and their metal salts.

7. A process for producing a molded propylene polymer product, which comprises the steps of:
blending 100 weight parts of the pellets of claim 1 with 100 to 1,000 weight parts of propylene polymer to give a blended product;
kneading the blended product under molten conditions to give a kneaded product; and
molding the kneaded product.

* * * * *